United States Patent
Lim et al.

(10) Patent No.: US 8,730,998 B2
(45) Date of Patent: May 20, 2014

(54) METHOD AND APPARATUS FOR TRANSMITTING/RECEIVING CONTROL INFORMATION IN BROADCAST COMMUNICATION SYSTEM

(75) Inventors: Yeon-Ju Lim, Seoul (KR); Hak-Ju Lee, Incheon (KR); Jae-Yoel Kim, Gyeonggi-do (KR); Hwan-Joon Kwon, Gyeonggi-do (KR); Hyeon-Woo Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 416 days.

(21) Appl. No.: 12/260,715

(22) Filed: Oct. 29, 2008

(65) Prior Publication Data

US 2009/0116512 A1 May 7, 2009

(30) Foreign Application Priority Data

Oct. 30, 2007 (KR) .................. 10-2007-0109876
Dec. 27, 2007 (KR) .................. 10-2007-0138647

(51) Int. Cl.
*H04J 3/24* (2006.01)

(52) U.S. Cl.
USPC ......................... 370/474; 370/475; 370/476

(58) Field of Classification Search
None
See application file for complete search history.

(56) References Cited

U.S. PATENT DOCUMENTS

| | | | |
|---|---|---|---|
| 2006/0128309 A1* | 6/2006 | Dateki et al. ............ | 455/41.3 |
| 2006/0245386 A1* | 11/2006 | Hu ........................... | 370/312 |
| 2007/0253367 A1* | 11/2007 | Dang et al. .............. | 370/329 |
| 2008/0247337 A1* | 10/2008 | Li et al. .................... | 370/280 |

FOREIGN PATENT DOCUMENTS

| | | |
|---|---|---|
| EP | 1 717 974 | 11/2006 |
| JP | 2004-134931 | 4/2004 |
| KR | 1020050008440 | 1/2005 |
| KR | 1020060016582 | 2/2006 |
| WO | WO 2006/061765 | 6/2006 |

OTHER PUBLICATIONS

BBC, Nokia, Teracom, DVB Organization: "DVB-T2 Concept", Digital Video Broadcasting, "T2_0200 Cft Response Teracom TFS_concept.pdf", Jun. 4, 2007.

Teracom/Nokia, DVB Organization: "Considerations of the Robustness of L1/L2 Signalling for DVB-T2", Digital Video Broadcasting, Sep. 15, 2007.

* cited by examiner

*Primary Examiner* — Kibrom T Hailu

(74) *Attorney, Agent, or Firm* — The Farrell Law Firm, P.C.

(57) ABSTRACT

Disclosed is a method and apparatus for transmitting/receiving control information in a system in which one or more Radio Frequencies (RFs) are used to carry multiple services through a frame constituted by time resources or time-frequency resources. Control information regarding frame configuration information is not transmitted over a separate control channel but over a data channel through which to transmit primary service traffic among all service traffic, and each non-primary service traffic other than the primary service traffic includes control information for a primary service. Thus, even when a receiver changes the current service to a target service, control information necessary to detect the location of the target service in a frame and demodulate the target service can be acquired, and thus a service change can be made without reading a separate control channel.

8 Claims, 12 Drawing Sheets

FIG.2B
(PRIOR ART)

METHOD AND APPARATUS FOR TRANSMITTING/RECEIVING CONTROL INFORMATION IN BROADCAST COMMUNICATION SYSTEM

PRIORITY

This application claims priority to an application entitled "Method and Apparatus for Transmitting/Receiving Control Information in Broadcast Communication System", filed in the Korean Industrial Property Office on Oct. 30, 2007, and assigned Serial No. 2007-0109876 and an application entitled "Method and Apparatus for Transmitting/Receiving Control Information in Broadcast Communication System", filed in the Korean Industrial Property Office on Dec. 27, 2007 and assigned Serial No. 2007-0138647, the contents of each of which are hereby incorporated by reference.

BACKGROUND OF THE INVENTION

1. Field of the Invention

The present invention relates to a broadcast communication system in which one or Radio Frequencies (RFs) are used to carry multiple services, and more particularly to a method and apparatus for transmitting/receiving control information for a frame including multiple services.

2. Description of the Related Art

In the information society of the $21^{st}$ century, the age of digital, multi-channel, broadband, and high-quality broadcast communication services has begun in earnest. In particular, with the recent popularization of High Definition digital Televisions (HD digital TVs) and Portable Multimedia Players (PMPs), there is an increasing demand for digital broadcast services supporting various reception schemes.

In compliance with such a demand, the $2^{nd}$ Generation European terrestrial digital broadcast standard, the DVB-T2 (Digital Video Broadcasting-Terrestrial), is currently under standardization for three reception schemes, that is, a reception scheme reutilizing the conventional digital receive antenna for home use (fixed-type), a reception scheme using a multi-antenna for capacity enhancement, and a reception scheme for a mobile terminal (mobile-type). In contrast with the $1^{st}$ Generation European terrestrial digital broadcast standard, the DVB-T/H, which considers only two reception schemes, that is, the fixed-type and mobile-type reception schemes, the DVB-T2 adds the reception scheme using a multi-antenna to the two reception schemes, and is considering changes in a physical layer structure and control information according thereto.

In such a physical layer structure, a control message regarding a transmission scheme in each physical layer is transmitted over a control channel. For example, suppose that a signal is transmitted in units of frames, multiple services may constitute one frame, and the frame includes a service index, location information, a modulation scheme/code rate, a cell D for each service. Also, since service configuration information and its related information may vary from frame to frame, the control channel is transmitted separately from a data channel in each frame.

FIG. 1 illustrates a scheme of transmitting/receiving broadcast services in a Fixed Frequency (FF) mode, which represents the conventional $1^{st}$ generation broadcast communication system.

Referring to FIG. 1, a transmitter transmits broadcast services through multiple RFs (RF 1 to RF 4) carrying different services (service 1 to service 10). A receiver receives a desired service by tuning to an RF carrying the desired service. For example, when the receiver is to receive service 1, the receiver acquires location information and a modulation/coding scheme for service 1 by tuning to RF 1, and then demodulates service 1.

Figure 2B:
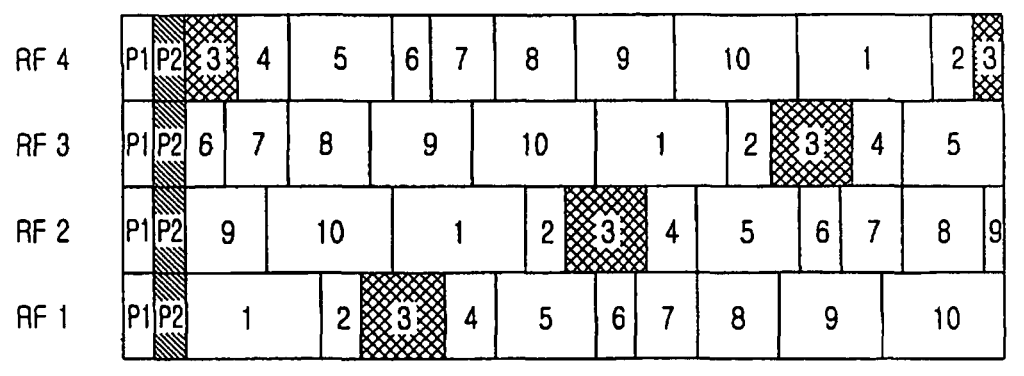

FIG. 2A illustrates a scheme of transmitting/receiving broadcast services in the conventional $2^{nd}$ generation broadcast communication system.

Referring to FIG. 2, a transmitter divides a service (each service in FIG. 1), which is in the form of a long packet, into a plurality of short sub-slots, and transmits the service in the form of the divided sub-slots through multiple RFs (RF 1 to RF 4) used to carry the service. A receiver tracks the location of the desired service in each RF containing the desired service through control information, and receives the corresponding service. As illustrated in FIG. 2A, when the receiver receives service 1, the receiver demodulates the corresponding service in the order of RF 1, RF 4. RF 3, and RF 2 according to the sequence in which sub-slots of the corresponding service can be received in the time domain. Thus, in the scheme of transmitting/receiving broadcast services in the conventional $2^{nd}$ Generation broadcast communication system, even when the same amount of services are transmitted, a small amount of data is transmitted through multiple RFs, as compared to when a large amount of data is transmitted at a time using a fixed RF for each service, so that time and frequency diversity gains can be expected. Such a frame configuration scheme is called Time-Frequency Slicing (TFS).

FIG. 2B illustrates a transfer frame format of convention TFS.

In the transfer frame format illustrated in FIG. 2B, ten service packets are transmitted through multiple RFs (RF 1 to RF 4). This TFS frame may be configured by allocating all service packets to one RF and arranging all of the service packets in an adjacent RF in such a manner as to be cyclically shifted. When four RFs are used as illustrated in FIG. 2B, each service basically uses four sub-slots because one service is transmitted through the four RFs, but may use five sub-slots due to cyclic shifting, as in the case of service 3.

Also, in FIG. 2B, signal P1 may be used as a preamble for time synchronization, and signal P2 carries control information for each service in the current or next frame. The control information includes location information regarding points of time at which each service begins and ends within a frame, and others. In particular, the location information for each service may be transmitted while being included not in signal P2 but in each service traffic. In such a case, it does not matter if signal P2 is not read during continuous reception of the same service.

However, when a receiver continues to receive a service, and then changes the current service channel to a different service channel, the receiver must acquire control information for a service corresponding to the different service channel in order to receive the service of the different service channel.

Therefore, there is a need for a method to efficiently transmit/receive control information for a target service of a service change so that the target service can be received when the service change occurs in a receiver.

SUMMARY OF THE INVENTION

Accordingly, the present invention has been made to solve at least the above-mentioned problems occurring in the prior art, and the present invention provides a method and apparatus for efficiently transmitting/receiving control information for a target service of a service change so that the target service can be received when the service change occurs in a receiver.

In accordance with an aspect of the present invention, there is provided a method of transmitting control information in a broadcast communication system, the method including generating a service control information signal that includes information on a location of a service within a frame and information necessary to demodulate the service; constructing the frame by inserting the generated signal into the frame; and transmitting the constructed frame.

In accordance with another aspect of the present invention, there is provided a method of receiving control information in a broadcast communication system, the method including receiving a frame, and receiving a service through the frame; determining if the service has changed to target service; when the service has changed to the target service, receiving and demodulating a target service control information signal that includes information on a location of the target service within a frame in which the target service is included and information necessary to demodulate the target service; and acquiring target service control information from the demodulated signal to receive the target service.

In accordance with yet another aspect of the present invention, there is provided an apparatus for transmitting control information in a broadcast communication system, the apparatus including a signal generator for generating a service control information signal that includes information on a location of a service within a frame and information necessary to demodulate the service; a frame constructor for constructing the frame by inserting the generated signal into the frame; and a transmitter for transmitting the constructed frame.

In accordance with still yet another aspect of the present invention, there is provided an apparatus for receiving control information in a broadcast communication system, the apparatus including a receiver for receiving a frame, and receiving a service through the frame; a service change determiner for determining if the service has changed to target service; a signal demodulator for, when the service has changed to the target service, receiving and demodulating a target service control information signal that includes information on a location of the target service within a frame in which the target service is included and information necessary to demodulate the target service; and a service demodulator for acquiring target service control information from the demodulated signal to receive and demodulate the target service.

In accordance with still yet another aspect of the present invention, there is provided a method of transmitting control information in a broadcast communication system, the method including grouping services into at least one group; determining one service as a primary service in each group; inserting non-primary service control information, which includes information on locations of non-primary services of the corresponding group and information necessary to demodulate the non-primary services, and primary service control information, which includes information on locations of primary services of other groups and information necessary to demodulate the primary services of other groups, into primary service traffic for the primary service of the corresponding group; inserting primary service control information for the corresponding group into each non-primary service traffic for the non-primary services; and constructing a frame to include the primary service traffic and each non-primary service traffic, and transmitting the constructed frame.

In accordance with still yet another aspect of the present invention, there is provided a method of receiving control information in a broadcast communication system, the method including receiving a frame, and receiving a service through the frame; determining if the service has changed to a target service, and determining if the target service is included in a different group from a group to which the service belongs; when the target service is included in the different group from the group to which the service belongs, demodulating the service to acquire first control information including information on a location of a first primary service of the group to which the service belongs and information necessary to demodulate the first primary service; demodulating the first primary service with the first control information to acquire second control information for a second primary service of the group in which the target service is included; demodulating the second primary service with the second control information to acquire third control information for the target service; and demodulating the target service with the third control information to receive the target service.

In accordance with still yet another aspect of the present invention, there is provided an apparatus for transmitting control information in a broadcast communication system, the apparatus including a primary service determiner for determining one service as a primary service in each group grouped into at least one group; a primary service control information inserter for inserting non-primary service control information, which includes information on locations of non-primary services of the corresponding group and information necessary to demodulate the non-primary services, and primary service control information, which includes information on locations of primary services of other groups and information necessary to demodulate the primary services of other groups, into primary service traffic for the primary service of the corresponding group; a non-primary service control information inserter for inserting primary service control information for the corresponding group into each non-primary service traffic for the non-primary services; a frame constructor for constructing a frame including the primary service traffic and each non-primary service traffic; and a transmitter for transmitting the constructed frame.

In accordance with still yet another aspect of the present invention, there is provided an apparatus for receiving control information in a broadcast communication system, the apparatus including a receiver for receiving a frame, and receiving a service through the frame; a service change determiner for, when the service has changed to a target service, determining if the target service is included in a different group from a group to which the service belongs; and a demodulator for, when the target service is included in the different group from the group to which the service belongs, demodulating the service to acquire first control information including information on a location of a first primary service of the group to which the service belongs and information necessary to demodulate the first primary service, demodulating the first primary service with the first control information to acquire second control information for a second primary service of the group in which the target service is included, demodulating the second primary service with the second control information to acquire third control information for the target service, and demodulating the target service with the third control information to receive the target service.

In accordance with still yet another aspect of the present invention, there is provided a method of transmitting control information in a broadcast communication system, the method including grouping services into at least one group; determining one service as a primary service in each group;

inserting non-primary service control information including information on locations of non-primary services of the corresponding group and information necessary to demodulate the non-primary services into primary service traffic for the primary service of the corresponding group; inserting primary service control information, which includes information on a location of the primary service and information necessary to demodulate the primary service, and primary service control information for other groups into each non-primary service traffic for the non-primary services; and constructing a frame including the primary service traffic and each non-primary service traffic, and transmitting the constructed frame.

In accordance with still yet another aspect of the present invention, there is provided a method of receiving control information in a broadcast communication system, the method including receiving a frame, and receiving a service through the frame; determining if the service has changed to a target service; when the service has changed to the target service, demodulating the service to acquire first control information including information on a location of a first primary service of a group in which the target service is included and information necessary to demodulate the first primary service; demodulating the first primary service with the first control information to acquire second control information for the target service; and demodulating the target service with the second control information to receive the target service.

In accordance with still yet another aspect of the present invention, there is provided an apparatus for transmitting control information in a broadcast communication system, the apparatus including a primary service determiner for determining one service as a primary service in each group grouped into at least one group; a primary service control information inserter for inserting non-primary service control information including information on locations of non-primary services of the corresponding group and information necessary to demodulate the non-primary services into primary service traffic for the primary service of the corresponding group; a non-primary service control information inserter for inserting primary service control information, which includes information on a location of the primary service and information necessary to demodulate the primary service, and primary service control information for other groups into each non-primary service traffic for the non-primary services; a frame constructor for constructing a frame including the primary service traffic and each non-primary service traffic; and a transmitter for transmitting the constructed frame.

In accordance with still yet another aspect of the present invention, there is provided an apparatus for receiving control information in a broadcast communication system, the apparatus including a receiver for receiving a frame, and receiving a service through the frame; a service change determiner for determining if the service has changed to a target service; and a demodulator for, when the service has changed to the target service, demodulating the service to acquire first control information including information on a location of a first primary service of a group in which the target service is included and information necessary to demodulate the first primary service, demodulating the first primary service with the first control information to acquire second control information for the target service, and demodulating the target service with the second control information to receive the target service.

BRIEF DESCRIPTION OF THE DRAWINGS

The above and other objects, features and advantages of the present invention will be more apparent from the following detailed description taken in conjunction with the accompanying drawings, in which:

FIG. 2B is a diagram illustrating a transfer frame format of convention TFS;

DETAILED DESCRIPTION OF THE EXEMPLARY EMBODIMENT

Figure 1:
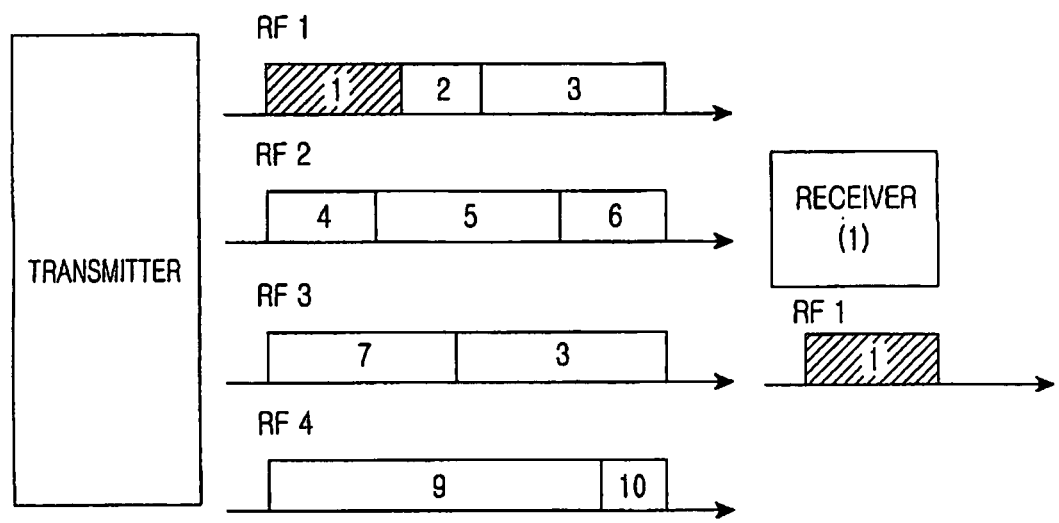
FIG. 1 is a diagram illustrating a scheme of transmitting/receiving broadcast services in a Fixed Frequency (FF) mode, which represents the conventional $1^{st}$ Generation broadcast communication system.
Figure 2A:
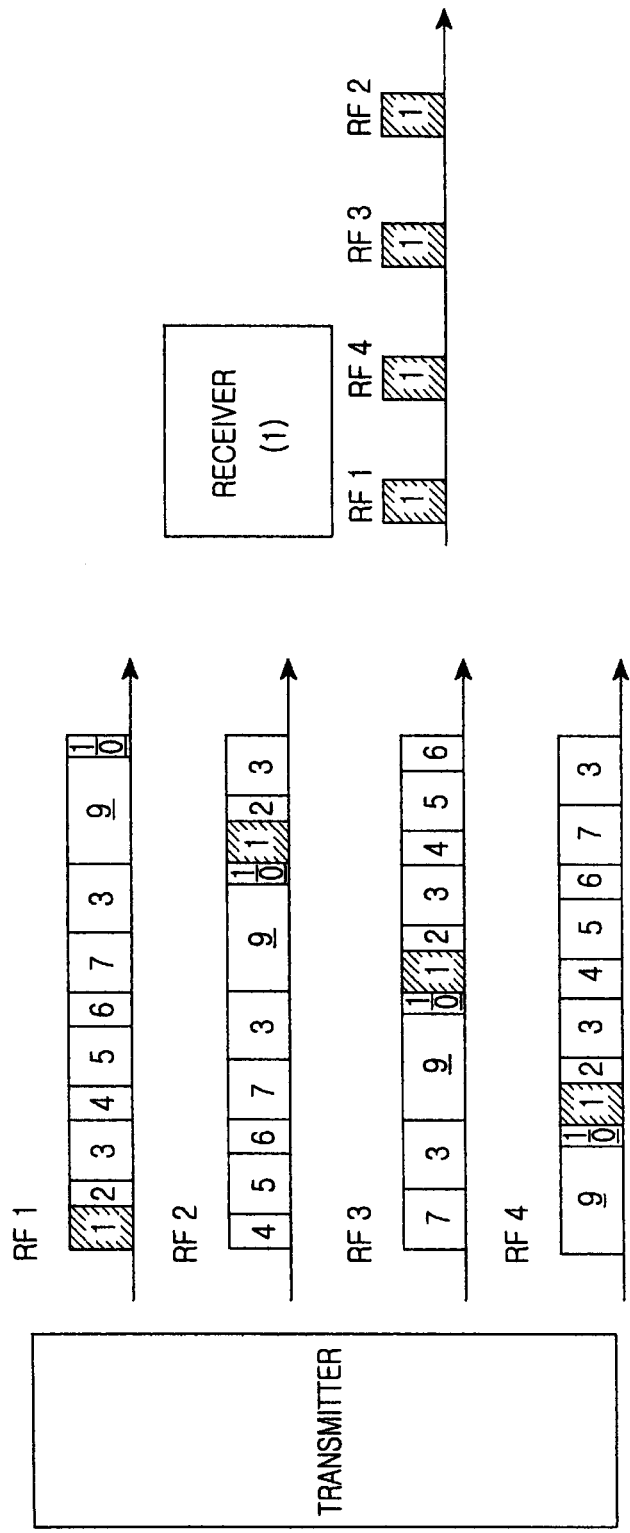
FIG. 2A is a diagram illustrating a scheme of transmitting/receiving broadcast services in the conventional $2^{nd}$ Generation broadcast communication system.

Hereinafter, exemplary embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the understanding of the present invention.

Figure 3:
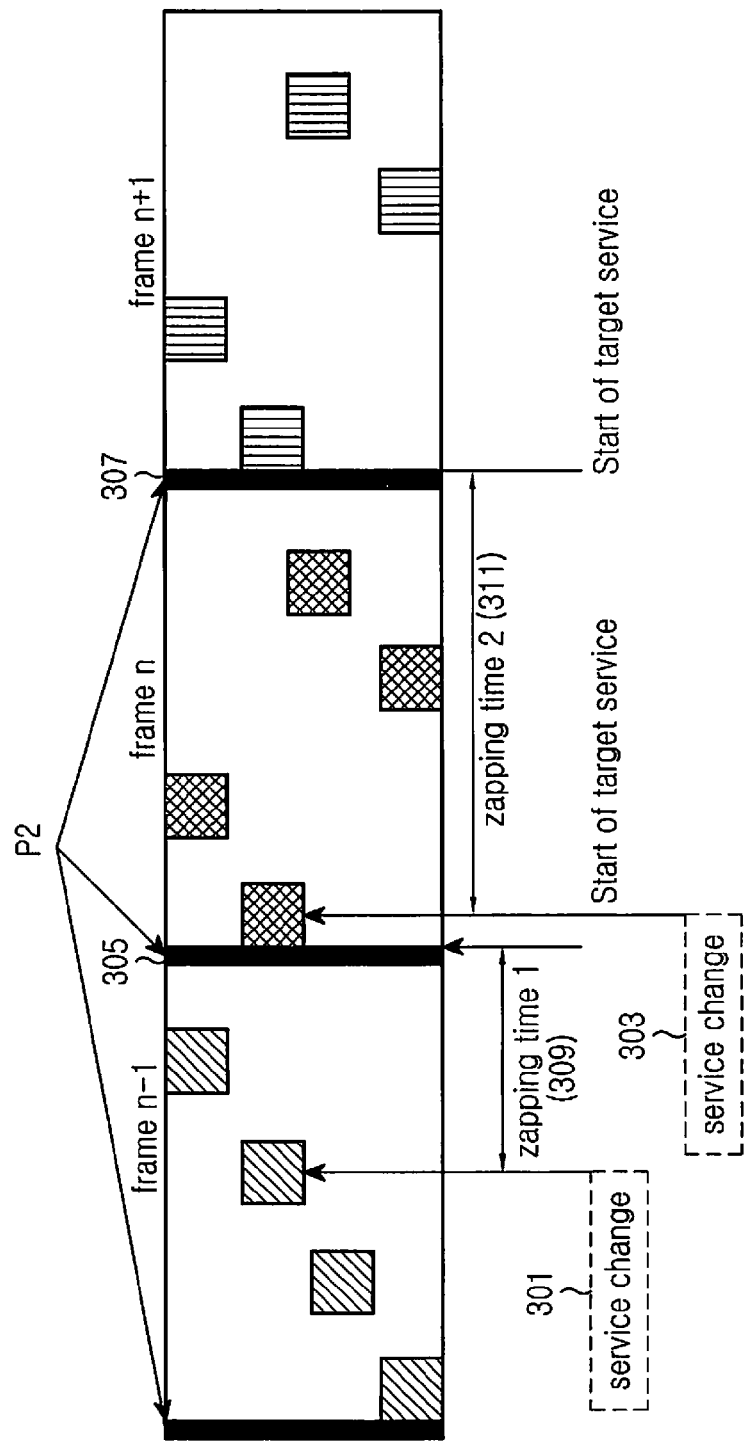
FIG. 3 is a diagram illustrating a process of changing from an existing service to a target service when a service change occurs in accordance with a first exemplary embodiment of the present invention.

FIG. 3 illustrates a process of changing from an existing service to a target service when a service change occurs according to a first exemplary embodiment of the present invention.

In FIG. 3, signal P2 is transmitted in each frame, and includes frame configuration information representing information on the current frame, the next frame, or an interval corresponding to one frame length from a point at a distance from signal P2.

When four RFs are used in one frame, as illustrated in FIG. 3, four sub-slots must be received in each frame.

Reference will now be made to a process of changing from an existing service to another service (i.e. a target service) when a service change occurs according to the first embodiment of the present invention, on the assumption that signal P2 includes information on the current frame.

If a service change 301 occurs while the third sub-slot of a service is received in frame n−1, a receiver receives a target service by receiving signal P2 305 from a next frame (frame n), which is the closest to the frame (frame n−1) subjected to the service change and includes signal P2, to acquire control information for target service reception.

Also, if a service change 303 occurs at the first sub-slot in frame n, the receiver reads signal P2 307 from frame n+1 to receive a target service in frame n+1.

When the time required from a point in time of a service change to a point in time of target service reception is defined as a zapping time, the zapping time (zapping time 2 (311) for the service change 303 occurring immediately after reception of signal P2 is longer than the zapping time (zapping time 1 (309) for the service change 301 occurring immediately before reception of signal P2.

Since signal P2 that carries control information for services is particularly susceptible to interference, such as impulse noise, demodulating signal P2 in the current frame may be unsuccessful. Then, a receiver must attempt to demodulate signal P2 in the next frame, and cannot acquire control information for a target service until it successfully demodulates signal P2. Therefore, a way to transmit/receive control information independent of signal P2 is needed.

In second and third exemplary embodiments of the present invention, based on a method of transmitting/receiving control information independent of signal P2, a new frame configuration is proposed. In one transfer frame, signal P2 including control information, which is necessary to actually receive broadcast data, and at least one broadcast service are transmitted in a time division scheme. Each broadcast service is divided into a primary service and a non-primary service. Primary service traffic for a primary service includes not only location information for the primary service but also control information for all services that are being broadcast, together with actual broadcast data. A non-primary service refers to all services other than a primary service, and non-primary service traffic for each non-primary service includes location information for the non-primary service and control information for the primary service.

Additionally, when all services to be transmitted from a base station to a mobile station are grouped into at least one group (one group to groups corresponding to the total number of services), primary service traffic that is representative of each group includes control information for all services belonging to a corresponding group, as well as location information for a primary service of the corresponding group. Also, non-primary service traffic refers to all traffic within a group, other than the primary service traffic, and non-primary service traffic for non-primary services of each group include location information for a corresponding non-primary service and control information for the primary service of a group to which the corresponding non-primary service belongs. As previously mentioned, control information refers to a service index, location information, a modulation scheme/code rate, etc. With regard to this, control information for a service change in an FF mode includes RF information.

When the number of groups (i.e. the number of primary services) used in each frame is changed, signaling of the number of groups is included in control information. For example, this signaling may be performed using as many bits as the number of groups (e.g. 2 bits for four groups), or through 1 bit-signaling indicating an increase/decrease in the number of groups, as compared to the previous frame. If base and mobile stations use a fixed number of groups, and all transmittable services are mapped to respective groups in a predetermined pattern, no separate signaling is needed.

Figure 4:
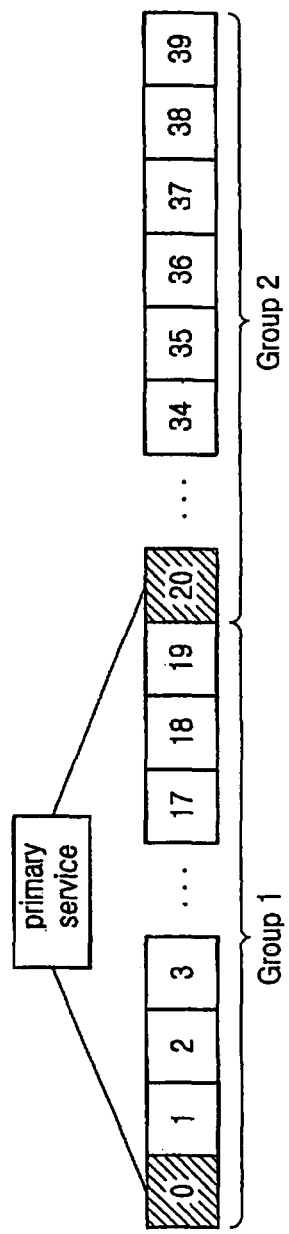
FIG. 4 is a diagram illustrating service grouping and primary services for supporting a service change process in accordance with second and third exemplary embodiments of the present invention.

FIG. 4 illustrates service grouping and primary services for supporting a service change process according to the second and third exemplary embodiments of the present invention.

When there are 40 services in total, and two groups are used in one frame, as illustrated in FIG. 4, the first 20 services (service 0 to service 19) among the services lined up in order of service index may be mapped to group 1, and the next 20 services (service 20 to service 39) may be mapped to group 2.

Here, a primary service may be serviced in each group, or a fixed service index may be used as a primary service.

In FIG. 4, when a service with the lowest service index (i.e. service 0 and service 20) is used as a primary service in each group, a corresponding primary service including control information for a target service to which the current service is changed can be known based on the service index of the target service. That is, when service 2 is received, and then a service change to service 30 occurs, control information for service 30 is acquired by demodulating the primary service with a higher service index (service with a service index of 20 in FIG. 4) among the two primary services.

In an extended example where services are grouped into four groups in units of 20 services, it is necessary to demodulate a primary service with the second lowest service index among four primary services when the same service change (service 2→service 30) is made.

Figure 5:
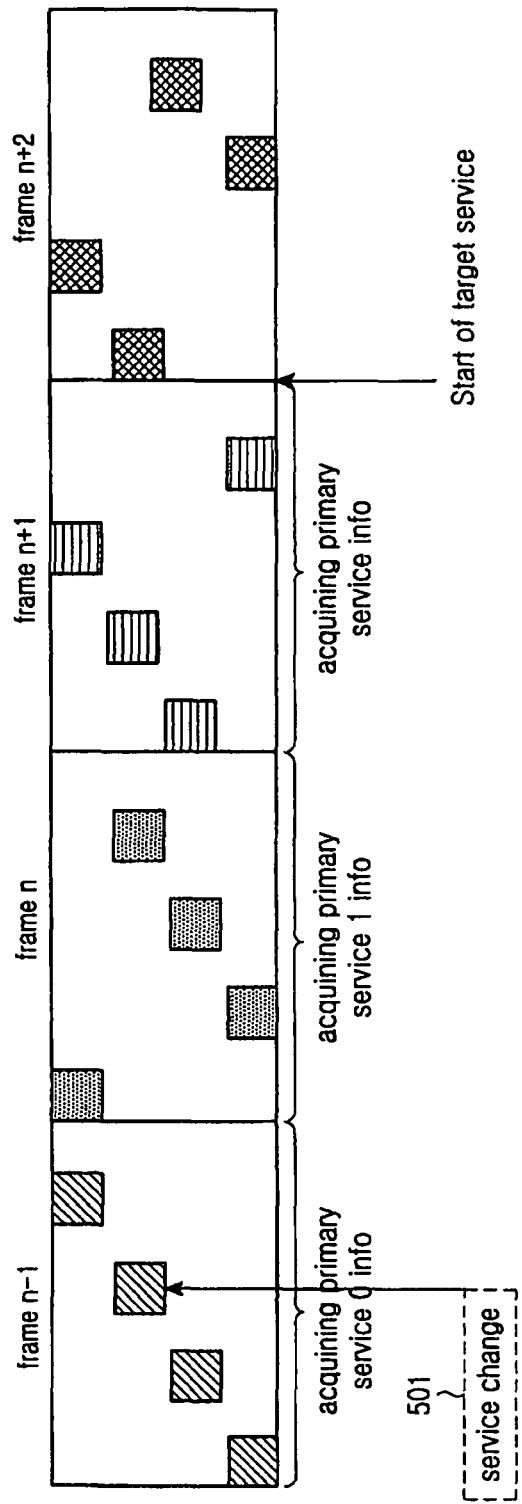
FIG. 5 is a diagram illustrating a process of changing from an existing service to a target service when a service change occurs in accordance with the second exemplary embodiment of the present invention.

FIG. 5 illustrates a process of changing from an existing service to a target service when a service change occurs according to the second exemplary embodiment of the present invention.

In FIG. 5, a process of performing signaling by applying the above-mentioned primary service according to the second embodiment is illustrated. In this embodiment, primary service traffic additionally includes control information for other primary services. Thus, when a service change 501 occurs in frame n−1, first control information for primary service 0 of a group to which the existing service belongs is acquired from frame n−1. With regard to this, since control information for the target service cannot be acquired through primary service 0 when the target service belongs to a different group from that of the existing service, second control information for primary service 1 is acquired by demodulating primary service 0 in frame n. Thus, third control information for the target service is acquired by receiving primary service 1 in frame n+1, and then receiving the target service is started from frame n+2. That is, if the target service belongs to the same group as that of the existing service, it is possible to receive the target service from frame n+1. Otherwise, it is required to acquire second control information for primary service 1 of a group in which the target service is included, and thus receiving the target service is started from frame n+2. When the target service belongs to the same group as that of the existing service, control information for the target service is acquired in frame n because the control information for the target service can be acquired through primary service 0, and then receiving the target service is started from frame n+1.

Figure 6:
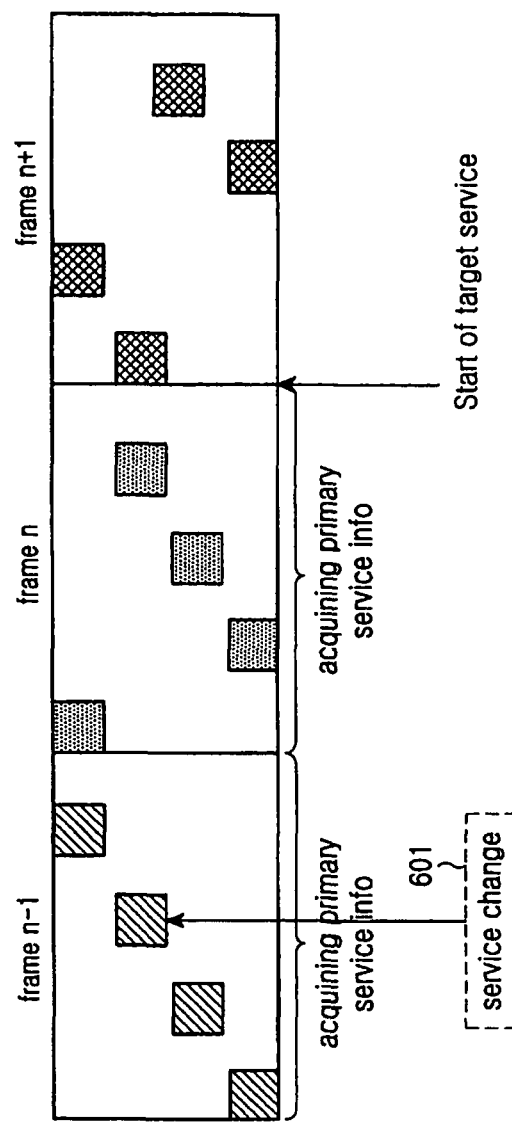
FIG. 6 is a diagram illustrating a process of changing from an existing service to a target service when a service change occurs in accordance with the third exemplary embodiment of the present invention.

FIG. 6 illustrates a process of changing from an existing service to a target service when a service change occurs according to the third exemplary embodiment of the present invention.

Referring to FIG. 6, when a service change 601 occurs in frame n−1, control information for a primary service to be received in frame n is acquired by continuing to receive corresponding service sub-slots. In this embodiment, non-primary service traffic additionally includes control information for primary services of other groups, as well as information on the primary service of a corresponding group. On account of this, in this embodiment, each primary service traffic does not need to include control information for other primary services. Thus, since non-primary service traffic includes control information for other primary services in this embodiment, it is possible to shorten a zapping time by one frame, as compared to when a primary service for a target service is demodulated always after the primary service of a group to which a corresponding non-primary service belongs is demodulated.

In other words, the signaling technique according to this embodiment makes it possible to immediately demodulate a primary service related to a target service and receive the target serviced in the next frame when a service change occurs. Thus, frame n−1 is received, a service index, a modulation scheme/code rate, and location information for a primary service to be demodulated in frame n are acquired, the primary service is demodulated using the control information for the primary service in frame n to acquire control information for a target service, and then the target service is received in frame n+1.

In the second and third embodiments of the present invention, as described above, control information signaling for a service change is performed in the same manner when the number of groups is one, that is, one primary service is used. Also, in the second and third embodiments of the present invention, insertion of signal P2 into each frame is not substantially needed because it is not necessary to read signal P2 for supporting a service change. Therefore, signal P2 may be transmitted in a cycle greater than one frame.

Figure 7:
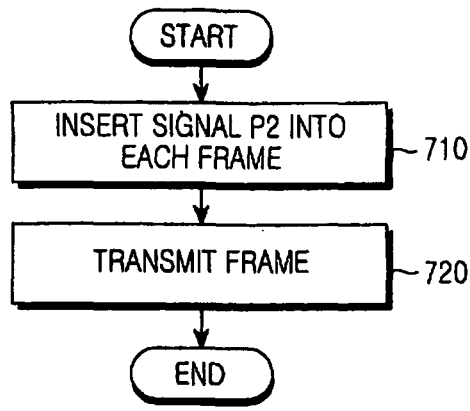
FIG. 7 is a flowchart illustrating an operation in a transmitter in accordance with the first exemplary embodiment of the present invention.

FIG. 7 illustrates an operation in a transmitter according to the first embodiment of the present invention.

Referring to FIG. 7, when a receiver changes a currently received service to another service according to the first embodiment, a transmitter may transmit control information for a target service through signal P2 separate from a data channel so as to allow the receiver to acquire the control information.

Thereupon, in step 710, the transmitter inserts signal P2 into a frame in order to reduce a zapping time as much as possible. In step 720, the transmitter transmits the frame with signal P2 inserted therein to the receiver.

Figure 8:
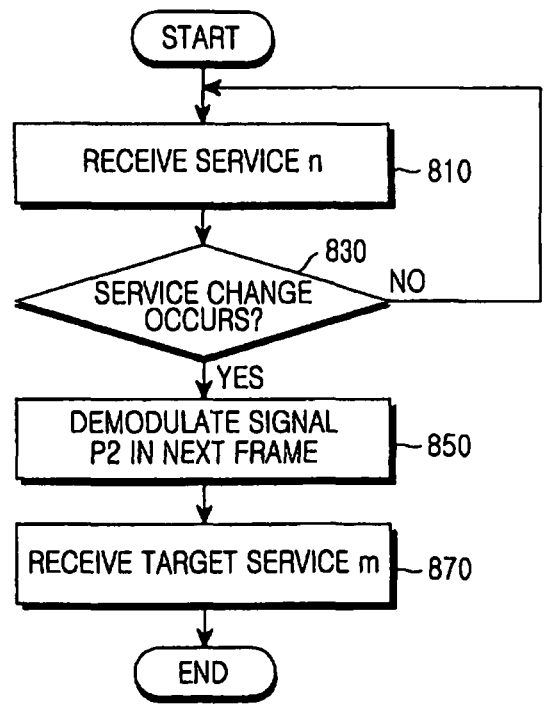
FIG. 8 is a flowchart illustrating an operation in a receiver in accordance with the first exemplary embodiment of the present invention.

FIG. 8 illustrates an operation in a receiver according to the first embodiment of the present invention.

Referring to FIG. 8, in step 810, a receiver receives service n from among frame indices. In step 830, the receiver determines if a service change occurs while service n is received. When the service change occurs, the receiver proceeds to step 850. Otherwise, the receiver proceeds to step 810, and continues to receive service n.

In step 850, the receiver receives and demodulates signal P2 in a next frame closest to a time point when the service change occurs.

Also, in step 870, the receiver acquires control information for target service m from demodulated signal P2, and then receives target service m at a location where the target service is transmitted.

Figure 9:
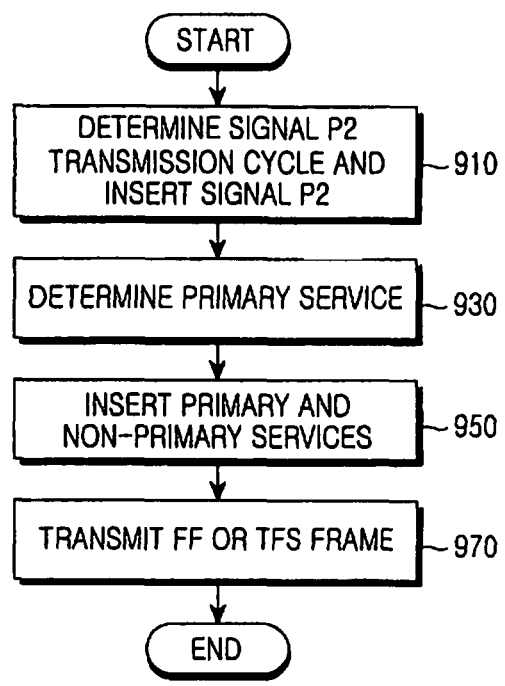
FIG. 9 is a flowchart illustrating an operation in a transmitter in accordance with the second and third exemplary embodiments of the present invention.

FIG. 9 illustrates an operation in a transmitter according to the second and third embodiments of the present invention.

Since a transmitter according to the second and third embodiments of the present invention uses a part of signal P2 as control information necessary for service demodulation, and transmits the part of signal P2 through a data channel, it is basically unnecessary to transmit signal P2 in each frame.

Referring to FIG. 9, in step 910, the transmitter determines a transmission cycle for signal P2, which is greater than the length of one frame, and then inserts signal P2 into a frame for transmission of signal P2 and transmits the frame in the determined transmission cycle.

In step 930, the transmitter determines a primary service including control information for non-primary services from among all services to be transmitted in each frame.

If the number of services used in each frame is changed, signaling thereof may be separately performed.

In step 950, the transmitter inserts control information into primary service traffic and non-primary service traffic that are assigned as primary and non-primary services according to the second and third embodiments of the present invention. That is, in step 950, the transmitter inserts control information for non-primary services of a group, to which a primary service belongs, and control information for primary services of other groups into primary service traffic, and inserts control information for the primary service of the group, to which the non-primary services belong, into each non-primary service traffic according to the second embodiment. Also, in step 950, the transmitter inserts information on non-primary services of a group, to which a primary service belongs, into primary service traffic, and inserts control information for the primary service of the group, to which the non-primary services belong, and control information of primary service of other groups into each non-primary service traffic according to the third embodiment.

In step 970, the transmitter inserts signaling information necessary for service change support into all service traffic, and then transmits a frame including all the service traffic.

Figure 10:
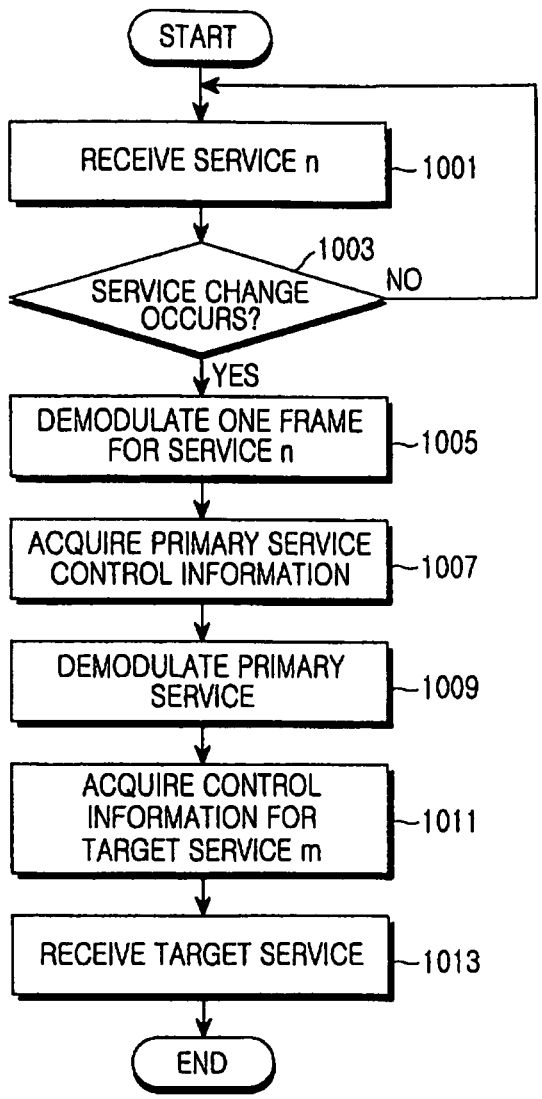
FIG. 10 is a flowchart illustrating an operation in a receiver in accordance with the second and third exemplary embodiments of the present invention.

FIG. 10 illustrates an operation in a receiver according to the second and third embodiments of the present invention.

Referring to FIG. 10, in step 1001, a receiver receives service n from among frame indices. In step 1003, the receiver determines if a service change occurs while service n is received. When the service change occurs, the receiver proceeds to step 1005. Otherwise, the receiver proceeds to step 1001, and continues to receive service n.

In step 1005, the receiver demodulates service n to the end in a frame in which the service change occurs, and thereby acquires control information for a primary service in step 1007.

In receiving a service in the TFS mode, when the receiver performs data interleaving in units of multiple sub-slots constituting one service, the receiver must receive all sub-slots in order to acquire the control information for the primary service, as described above. When the receiver performs data interleaving sub-slot by sub-slot, the receiver can acquire the control information for the primary service by only demodulating a sub-slot that is located at a time point when the service change occurs. In the present invention, it is assumed that data interleaving is performed in units of all sub-slots of each service.

In step 1009, the receiver demodulates the primary service according to the second and third embodiments of the present invention. That is, according to the second embodiment, the receiver demodulates two primary services in step 1009 when a target service for which the service change is made does not belong to the same group as that of the previous received service. According to the third embodiment, the receiver demodulates only one primary service.

Thus, in the second embodiment of the present invention, the receiver repeats steps 1007 and 1009 twice when the target service does not belong to the same group as that of the previous service.

In step 1011, the receiver acquires control information for target service m for which the service change is made. Then, in step 1013, the receiver demodulates target service m at its reception location in the next frame by using the control information for target service m.

Figure 11:
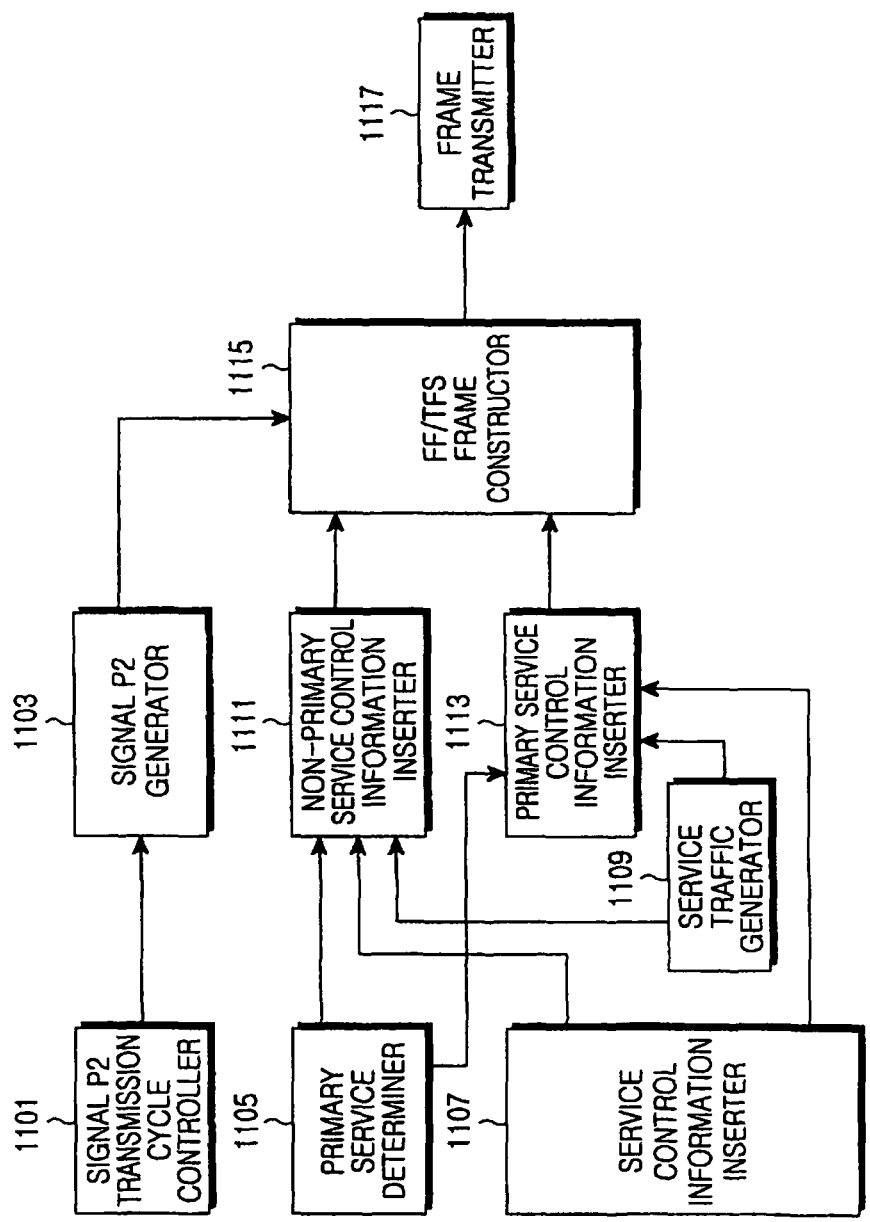
FIG. 11 is a block diagram illustrating a transmitter in accordance with an exemplary embodiment of the present invention.

FIG. 11 illustrates a transmitter according to an exemplary embodiment of the present invention.

Referring to FIG. 11, a signal P2 transmission cycle controller 1101 determines a cycle in which signal P2 is transmitted. For example, signal P2 may be transmitted in a cycle of one frame, or may be transmitted in a cycle of five frames.

A signal P2 generator 1103 generates signal P2 indicating control information for a corresponding frame with a frame index for transmitting signal P2 in the determined transmission cycle.

A primary service determiner 1105 determines a primary service from among all services that are transmitted in each frame or in a certain cycle. When a plurality of primary services are used, all the services are grouped into several groups, and a scheme of mapping each service to a corresponding group may be predetermined between a transmitter and a receiver. Although not illustrated in FIG. 11, a unit is required for generating and inserting signaling information necessary to signal the number of primary services, that is, the number of groups.

A service control information generator 1107 generates control information for a primary service and non-primary services of each group.

A service traffic generator 1109 generates primary service traffic and non-primary service traffic for a primary service and non-primary services of each group.

A non-primary service control information inserter 1111 inserts control information for corresponding non-primary services into the generated primary service traffic of each group.

A primary service control information inserter 1113 inserts control information for a corresponding primary service into the generated non-primary service traffic of each group. Also, the primary service control information inserter 1113 inserts control information primary services of all groups into the generated primary service traffic of each group according to the second embodiment, or inserts control information for primary services of all groups into the generated non-primary service traffic.

An FF/TFS frame constructor 1115 constructs an FF or TFS frame by using all the service traffic (primary service traffic and non-primary service traffic), into which the control information is inserted, together with signal P2 according to the determined P2 transmission cycle, or without signal P2. A frame transmitter 1117 transmits the constructed FF or TFS frame to a receiver.

Figure 12A:
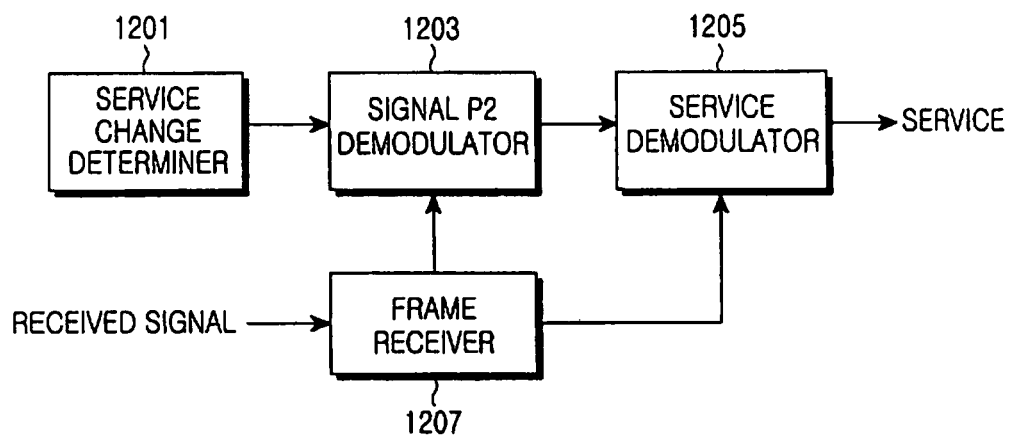
FIG. 12A is a block diagram illustrating a receiver in accordance with the first exemplary embodiment of the present invention.

FIG. 12A illustrates a receiver according to the first embodiment of the present invention.

Referring to FIG. 12A, a frame receiver 1207 receives a signal transmitted from a transmitter, transfers signal P2 to a signal P2 demodulator 1203, and transfers data of a service to a service demodulator 1205.

A service change determiner 1201 determines if service change request is made in the middle of receiving a service, thereby determining if a service change occurs.

When the service change determiner 1201 determines that a service change occurs, the signal P2 demodulator 1203 demodulates signal P2, transferred from the frame receiver 1207, at a point in time of the service change.

The service demodulator 1205 acquires control information for a target service from signal P2 demodulated by the signal P2 demodulator 1203, and receives the target service by demodulating the control information.

Figure 12B:
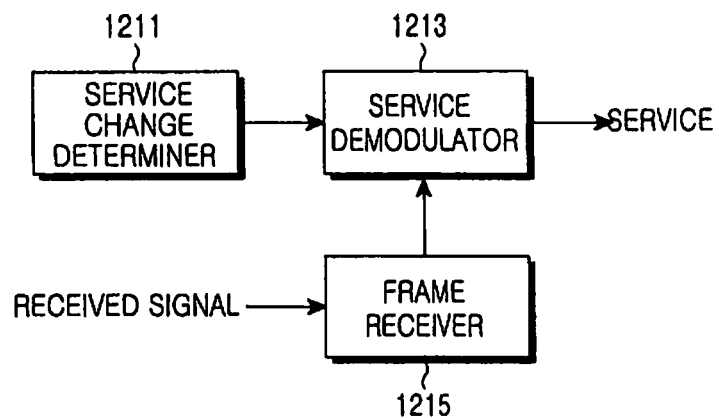
FIG. 12B is a block diagram illustrating a receiver in accordance with the second and third exemplary embodiments of the present invention.

FIG. 12B illustrates a receiver according to the second and third embodiments of the present invention.

Referring to FIG. 12B, a frame receiver 1215 receives a signal transmitted from a transmitter, and transfers it to a service demodulator 1213.

A service change determiner 1211 determines if service change request is made in the middle of receiving a service, thereby determining if a service change occurs. The service demodulator 1213 demodulates a service in the current frame, and acquires control information for a primary service. The service demodulator 1213 demodulates the primary service by using the control information for the primary service, and then acquires control information for a target service. Also, the service demodulator 1213 receives the target service by demodulating the acquired control information for the target service. Although the service demodulator 1213 as described above corresponds to the third embodiment of the present invention, it has only to perform the above operation once more when two primary services must be demodulated in the second embodiment of the present invention.

According to the present invention as described above, one or multiple RFs are used to efficiently transmit/receive a frame including multiple services. Therefore, even when a service is changed to another service (i.e. the target service), the target service can be received.

While the invention has been shown and described with reference to a certain exemplary embodiment thereof, it will be understood by those skilled in the art that various changes in form and details may be made therein without departing from the spirit and scope of the invention as defined by the appended claims and equivalents thereof.

What is claimed is:

1. A method of receiving control information in a broadcast communication system, the method comprising the steps of:
   determining whether a first service that is currently provided is changed to a second service; and
   upon determining that the first service is changed to the second service, receiving, through a data part of a frame, the second service and second service control information that includes information indicating a location on which the second service is transmitted and information necessary to demodulate the second service, the frame comprising the data part configured to include at least one service of the frame and a separate control part configured to include other control information corresponding to the at least one service.

2. An apparatus for receiving control information in a broadcast communication system, the apparatus comprising:

a service change determiner configured for determining whether a first service that is currently provided is changed to a second service; and a receiver configured for, upon determining that the first service is changed to the second service, receiving, through a data part of a frame, the second service and second service control information that includes information indicating a location on which the second service is transmitted and information necessary to demodulate the second service, the frame comprising the data part configured to include at least one service of the frame and a separate control part configured to include other control information corresponding to the at least one service.

3. A method of receiving control information in a broadcast communication system, the method comprising the steps of:

determining whether a first service that is currently provided is changed to a second service, and determining, upon determining that the first service is changed to the second service, whether the second service is included in a different group from a group to which the first service belongs;

demodulating, if the second service is included in the different group from the group to which the first service belongs, the first service to acquire first control information including information indicating a location of a first primary service of the group to which the first service belongs and information necessary to demodulate the first primary service;

demodulating the first primary service with the first control information to acquire second control information for a second primary service of the group in which the second service is included; and demodulating the second primary service with the second control information to acquire third control information for the second service.

4. The method as claimed in claim 3, further comprising:

demodulating, if the second service is included in the same group as the group to which the first service belongs, demodulating the first service to acquire first control information that includes information indicating a location of the first primary service of the group to which the first service belongs and information necessary to demodulate the first primary service; and demodulating the first primary service with the first control information to acquire third control information for the second service.

5. An apparatus for receiving control information in a broadcast communication system, the apparatus comprising:

a receiver for receiving a frame;

a service change determiner for determining whether a first service that is currently provided is changed to a second service, and determining, upon determining that the first service is changed to the second service, whether the second service is included in a different group from a group to which the first service belongs; and a demodulator for, if the second service is included in the different group from the group to which the first service belongs, demodulating the first service to acquire first control information including information indicating a location of a first primary service of the group to which the first service belongs and information necessary to demodulate the first primary service, demodulating the first primary service with the first control information to acquire second control information for a second primary service of the group in which the second service is included, and demodulating the second primary service with the second control information to acquire third control information for the second service.

6. The apparatus as claimed in claim 5, wherein, if the second service is included in the same group as the group to which the first service belongs, the demodulator demodulates the first service to acquire first control information including information on a location of a first primary service of the group to which the first service belongs and information necessary to demodulate the first primary service, and demodulates the first primary service with the first control information to acquire third control information for the second service.

7. A method of receiving control information in a broadcast communication system, the method comprising the steps of:

determining whether a first service that is currently provided is changed to a second service;

demodulating, upon determining that the first service is changed to the second service, the first service to acquire first control information that includes information indicating a location of a first primary service of a group in which the second service is included and information necessary to demodulate the first primary service; and demodulating the first primary service with the first control information to acquire second control information for the second service.

8. An apparatus for receiving control information in a broadcast communication system, the apparatus comprising:

a receiver for receiving a frame;

a service change determiner for determining whether a first service that is currently provided is changed to a second service; and a demodulator for, demodulating, upon determining that the first service is changed to the second service, the first service to acquire first control information that includes information indicating a location of a first primary service of a group in which the second service is included and information necessary to demodulate the first primary service, demodulating the first primary service with the first control information to acquire second control information for the second service, and demodulating the second service using the second control information.

* * * * *